United States Patent
Kang et al.

(10) Patent No.: US 12,529,759 B2
(45) Date of Patent: Jan. 20, 2026

(54) ELECTRONIC DEVICE FOR DETECTING OBJECT AND METHOD OF THE SAME

(71) Applicant: SAMSUNG ELECTRONICS CO., LTD., Suwon-si (KR)

(72) Inventors: Moonseok Kang, Suwon-si (KR); Yi Yang, Suwon-si (KR); Hyunchul Kim, Suwon-si (KR); Jaehyung Seo, Suwon-si (KR); Jiho Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 389 days.

(21) Appl. No.: 17/988,215

(22) Filed: Nov. 16, 2022

(65) Prior Publication Data

US 2023/0126730 A1    Apr. 27, 2023

Related U.S. Application Data

(63) Continuation of application No. PCT/KR2022/016361, filed on Oct. 25, 2022.

(30) Foreign Application Priority Data

Oct. 25, 2021   (KR) ......................... 10-2021-0142673

(51) Int. Cl.
*G01S 7/292*   (2006.01)
*G01S 7/00*    (2006.01)
(Continued)

(52) U.S. Cl.
CPC ............ *G01S 7/2922* (2013.01); *G01S 7/006* (2013.01); *G01S 13/0209* (2013.01); *G01S 13/76* (2013.01); *G01S 13/87* (2013.01)

(58) Field of Classification Search
CPC ...................................................... G01S 7/411
See application file for complete search history.

(56) References Cited

U.S. PATENT DOCUMENTS 11,381,277 B2    7/2022   Jang et al.
11,445,468 B2    9/2022   Yang et al.
(Continued)

FOREIGN PATENT DOCUMENTS

JP    2012-127747    7/2012
JP    2013-033024    2/2013
(Continued)

OTHER PUBLICATIONS

Search Report dated Feb. 3, 2023 in International Patent Application No. PCT/KR2022/016361.
(Continued)

*Primary Examiner* — Vladimir Magloire
*Assistant Examiner* — Eric K Hodac
(74) *Attorney, Agent, or Firm* — Nixon & Vanderhye, P.C.

(57) ABSTRACT

An example electronic device may include a wireless communication circuit and a sensor, and at least one processor configured to be adaptively connected to the wireless communication circuit and the sensor. The processor may be configured to obtain data about a detectable area for an object, based on a UWB measurement signal transmitted using the wireless communication circuit, obtain a confidence level for the data about the detectable area, adjust a threshold value of the confidence level according to propagation environment information obtained using the wireless communication circuit, and filter and output the data about the detectable area, based on the adjusted threshold value of the confidence level.

16 Claims, 12 Drawing Sheets

(51) Int. Cl.
*G01S 13/02* (2006.01)
*G01S 13/76* (2006.01)
*G01S 13/87* (2006.01)

(56) References Cited

U.S. PATENT DOCUMENTS

| | | | |
|---|---|---|---|
| 2012/0120768 A1 | 5/2012 | Horsky et al. | |
| 2017/0097413 A1 | 4/2017 | Gillian et al. | |
| 2018/0292834 A1* | 10/2018 | Kindo | G01C 21/3415 |
| 2020/0049811 A1* | 2/2020 | Bialer | G01S 13/589 |
| 2021/0011147 A1 | 1/2021 | Va et al. | |
| 2022/0120885 A1 | 4/2022 | Choi et al. | |
| 2022/0397656 A1 | 12/2022 | Nakano et al. | |
| 2023/0081472 A1* | 3/2023 | Wang | H04W 4/029 340/539.12 |
| 2024/0005776 A1* | 1/2024 | Lopareva | G08B 31/00 |

FOREIGN PATENT DOCUMENTS

| | | |
|---|---|---|
| JP | 2021-015005 | 2/2021 |
| KR | 10-2018-0061477 | 6/2018 |
| KR | 10-2020-0028671 | 3/2020 |
| KR | 10-2020-0131526 | 11/2020 |
| KR | 10-2021-0002906 | 1/2021 |
| KR | 10-2021-0030180 | 3/2021 |
| KR | 10-2021-0096384 | 8/2021 |
| WO | 2021/006711 | 1/2021 |
| WO | 2021/095558 | 5/2021 |

OTHER PUBLICATIONS

Written Opinion dated Feb. 3, 2023 in International Patent Application No. PCT/KR2022/016361.

* cited by examiner

ELECTRONIC DEVICE FOR DETECTING OBJECT AND METHOD OF THE SAME

CROSS-REFERENCE TO RELATED APPLICATIONS

This application is a continuation of International Application No. PCT/KR2022/016361 designating the United States, filed on Oct. 25, 2022, in the Korean Intellectual Property Receiving Office and claiming priority to Korean Patent Application No. 10-2021-0142673, filed on Oct. 25, 2021, in the Korean Intellectual Property Office, the disclosures of which are incorporated by reference herein in their entireties.

BACKGROUND

Field

Various embodiments disclosed herein relate to an electronic device for detecting an object and, more particularly, to an electronic device capable of adaptively determining an object detectable area according to a propagation environment.

Description of Related Art

Currently, various electronic devices, such as a smartphone, a tablet PC, a portable multimedia player (PMP), a personal digital assistant (PDA), a laptop personal computer (PC), and/or a wearable device, are widely used. With technological development, there is an increasing need to detect various objects existing in a short distance or to perform communication using an electronic device.

Studies are being conducted on a technology for using an electronic device supporting ultra-wideband (UWB) communication to measure a position of an object, including a different electronic device, through UWB communication and to provide various services based on the measured position.

Ultra-wideband communication may use a wider bandwidth than other communication methods, and position measurement using ultra-wideband communication may have a small error compared to position measurement using a GPS.

SUMMARY

An object detection function of detecting the position of an object using UWB communication technology may entail an error between a detectable area in which an object is determined to be positioned and an area in which the object is actually positioned, depending on a propagation environment.

Various embodiments disclosed herein are to provide a method for determining an object detectable area by obtaining a confidence level when an object is detected using UWB communication technology, and an electronic device therefor.

Various embodiments of the disclosure provide a method for determining an object detectable area by adaptively adjusting a confidence level according to a propagation environment when detecting an object using UWB communication technology and an electronic device therefor.

Technical aspects to be achieved in the disclosure are not limited to the technical aspects mentioned above, and other technical aspects not mentioned will be clearly understood by those skilled in the art from the following description.

An electronic device according to various embodiments disclosed herein may include a wireless communication circuit and at least one processor configured to be adaptively connected to the wireless communication circuit, wherein the processor may be configured to obtain data about a detectable area for an object, based on a UWB measurement signal transmitted using the wireless communication circuit, obtain a confidence level for the data about the detectable area, adjust a threshold value of the confidence level according to propagation environment information obtained using the wireless communication circuit, and filter and output the data about the detectable area, based on the adjusted threshold value of the confidence level.

A method for an electronic device according to various embodiments disclosed herein may include obtaining data about a detectable area for an object, based on a UWB measurement signal transmitted using a wireless communication circuit, obtaining a confidence level for the data about the detectable area, adjusting a threshold value of the confidence level according to propagation environment information obtained using the wireless communication circuit, and filtering and outputting the data about the detectable area, based on the adjusted threshold value of the confidence level.

According to various embodiments, when detecting an object using UWB communication technology of an electronic device, an object detectable area may be adaptively determined according to a propagation environment, thereby reducing the possibility of an error in object detection.

According to various embodiments, when detecting an object using UWB communication technology of an electronic device, a confidence level for determining an object detectable area may be adaptively adjusted according to a propagation environment, thereby determining a detectable area having a low probability of an error.

According to various embodiments, when detecting an object using UWB communication technology, a confidence level for determining an object detectable area may be adjusted according to a propagation environment, thereby reducing errors in object detection.

In addition, various effects directly or indirectly identified through this document may be provided.

BRIEF DESCRIPTION OF THE DRAWINGS

In describing the drawings, the same or like reference numerals may be used to refer to the same or like elements.

The above and other aspects, features and advantages of certain embodiments of the present disclosure will be more apparent from the following detailed description, taken in conjunction with the accompanying drawings, in which.

DETAILED DESCRIPTION

Figure 1:
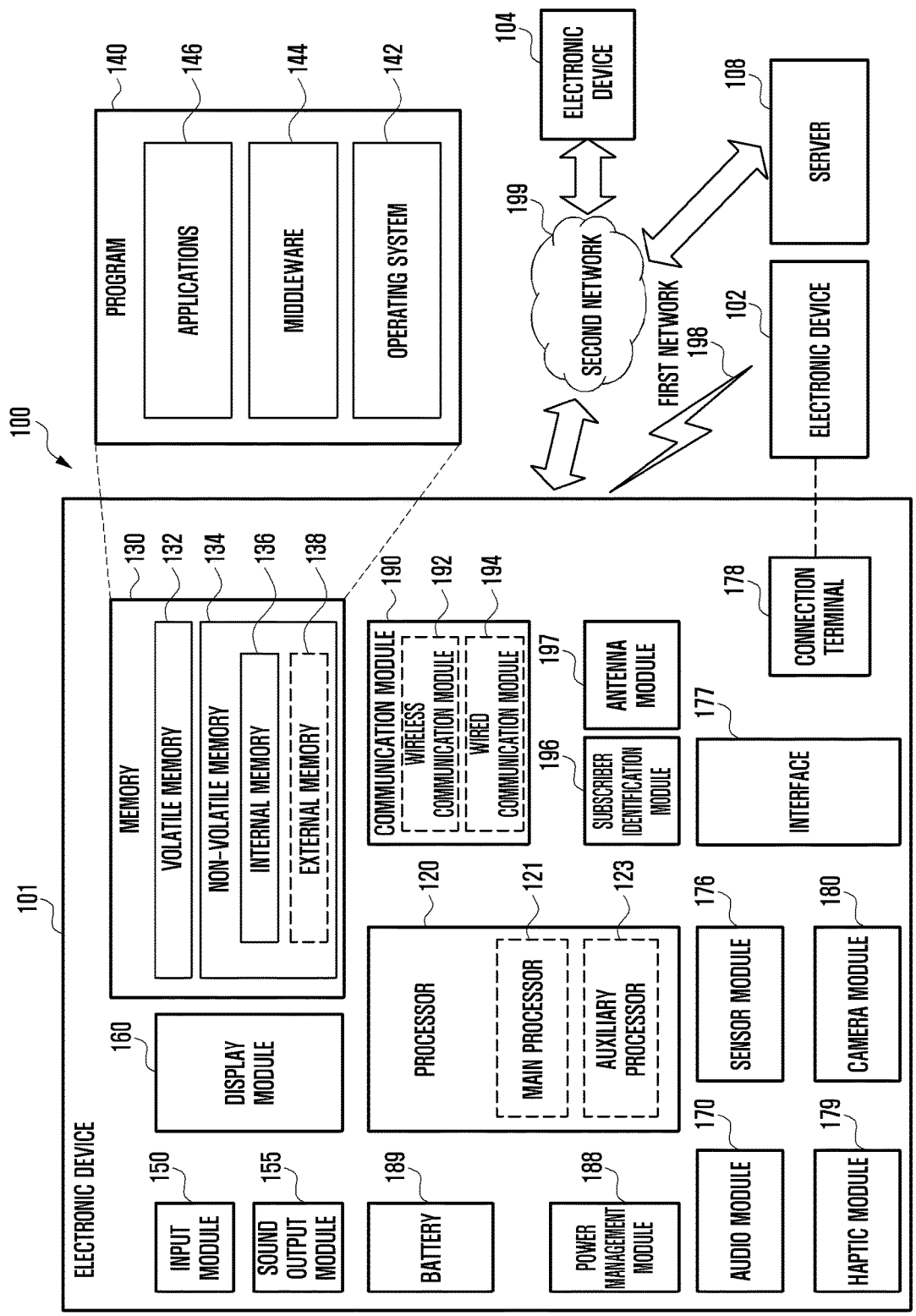
FIG. 1 is a block diagram of an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one of the components (e.g., the connection terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type from, the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
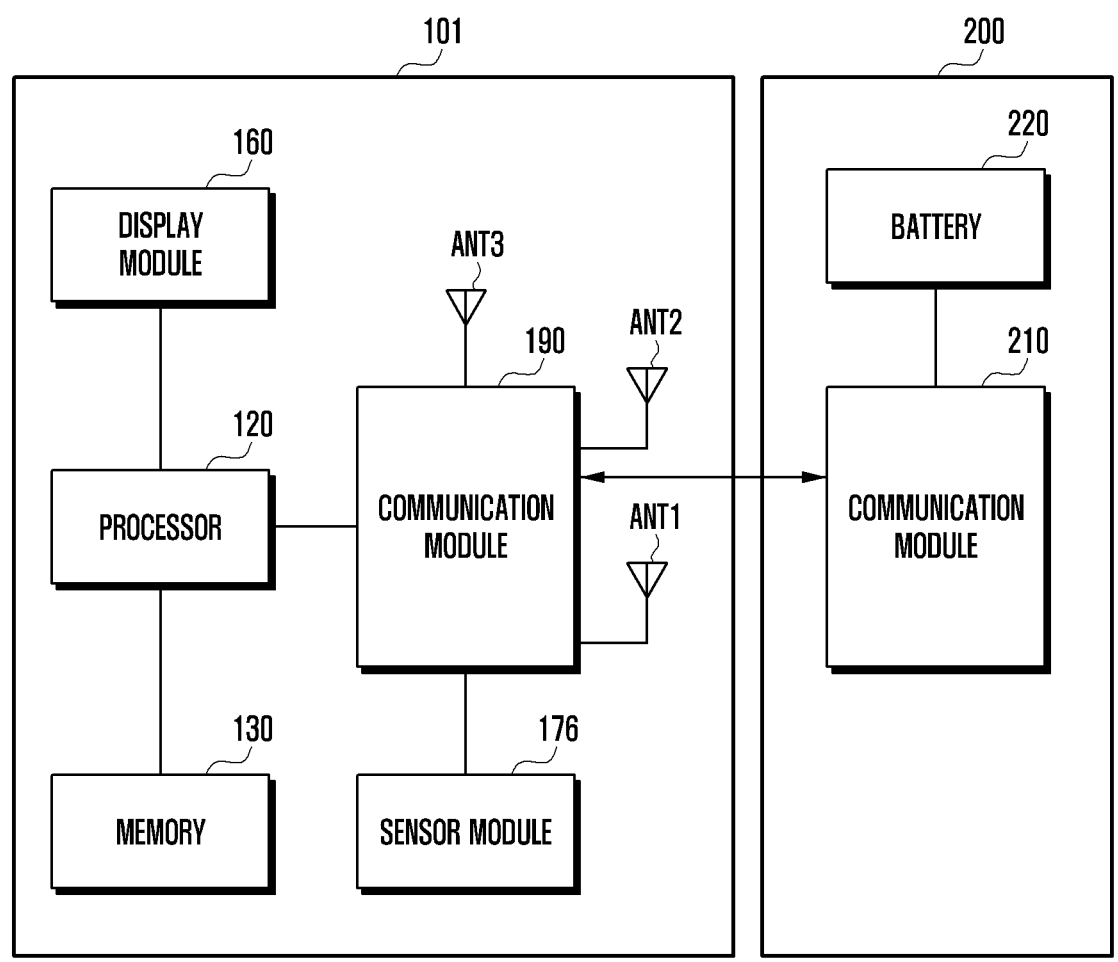
FIG. 2 is a block diagram of an example electronic device and an object according to various embodiments.

FIG. 2 is a block diagram of an example electronic device (e.g., the electronic device 101 of FIG. 1) and an example object 200 according to various embodiments.

According to an embodiment, the electronic device 101 may include various electronic devices having a communication function, such as a mobile communication terminal, a personal digital assistant (PDA), an electronic organizer, a smartphone, or a tablet personal computer (PC).

According to an embodiment, the electronic device 101 may include some or all of the components of the electronic device 101 of FIG. 1. For example, the electronic device 101 may include a processor (e.g., the processor 120 of FIG. 1), a memory (e.g., the memory 130 of FIG. 1), a display module (e.g., the display module 160 of FIG. 1), a sensor module (e.g., the sensor module 176 of FIG. 1), a communication circuit (e.g., the communication module 190 of FIG. 1), and antennas ANT1, ANT2, and ANT3 (e.g., the antenna module 197 of FIG. 1). Hereinafter, a redundant description of functions and/or characteristics of components similar to those described with reference to FIG. 1 may be omitted.

According to an embodiment, the communication circuit 190 may provide a UWB communication function. For example, when the communication circuit 190 provides a UWB radar function and/or a UWB ranging function, the processor 120 of the electronic device 101 may perform the UWB radar function and/or the UWB ranging function through the communication circuit 190 to obtain various types of data, such as a UWB measurement value. For example, the UWB measurement value may include a UWB ranging measurement value or an angle of arrival (AOA) measurement value according to the UWB ranging function and/or a UWB channel impulse response (CIR) measurement value according to the UWB radar function.

According to an embodiment, the processor 120 of the electronic device 101 may transmit a UWB signal using the communication circuit 190, for example, through three antennas ANT1, ANT2, and ANT3, and may perform the UWB ranging function, based on a signal received by the object 200 and transmitted from the object 200 in response.

According to an embodiment, the processor 120 of the electronic device 101 may transmit a UWB signal using the communication circuit 190, for example, through three antennas ANT1, ANT2, and ANT3, and may perform the UWB radar function, based on a signal reflected and received by the object 200.

According to an embodiment, the object 200 may include various electronic devices, such as a mobile communication terminal, a personal digital assistant (PDA), an electronic organizer, a smartphone, or a tablet personal computer (PC), or various objects including a communication chip having a UWB communication function, such as a smart tag.

According to an embodiment, the object 200 may include a communication module 210 and a battery 220, and the communication module 210 of the object 200 may provide a UWB communication function. In this case, the processor 120 of the electronic device 101 may transmit or receive a signal for performing UWB ranging to or from the communication module 210 of the object 200 through the communication circuit 190.

Figure 3:
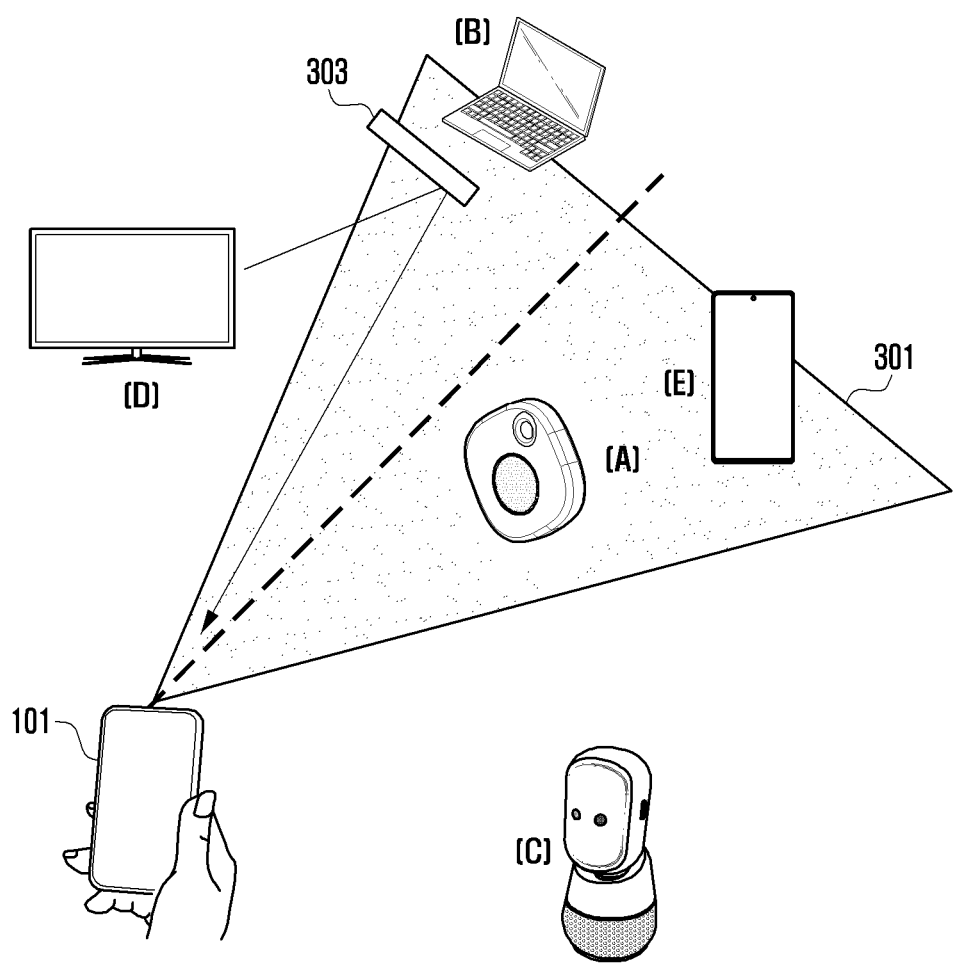
FIG. 3 illustrates an example of detecting an object in a detectable area of an electronic device according to various embodiments.

FIG. 3 illustrates an example of detecting an object according to a detectable area of an electronic device (e.g., the electronic device 101 of FIG. 1) according to various embodiments.

According to an embodiment, the electronic device 101 may transmit a UWB signal through an antenna (e.g., the antennas ANT1, ANT2, and ANT3 of FIG. 2) to perform a UWB ranging function.

The electronic device 101 may obtain a distance to objects including a smart tag (A), a laptop (B), and a smart phone (E) within a field of view (FOV) (or detectable area) 301 in which an object is detectable by the UWB ranging function and an angle of arrival (AOA), thereby identifying a relative position. For example, an AOA value may be defined as a relative angle (e.g., −50 degrees to 50 degrees) to an object with respect to the electronic device 101. For example, an AOA value may include a horizontal angle (AOA_azimuth) and a vertical angle (AOA_elevation). The electronic device 101 may not be able to detect an object (C) outside the detectable area. Hereinafter, the terms "viewing angle" or "detectable area" may be interchangeably used.

According to an embodiment, a false positive (FP) that the electronic device 101 detects the position of an object (D) outside the detectable area to be within the detectable area may occur. The false positive (FP) may include, for example, an inaccurate measurement value of the position and/or distance of an object from the electronic device 101. In performing wireless communication between the electronic device 101 and an object 200 or the ranging function, a radio signal may be reflected by a specific object 303, and thus a reflection path may be detected. For example, even though the object (D) is outside the detectable area 301, a transmitted signal may directly reach the object (D) or a UWB signal transmitted to the detectable area may reach the object (D) through reflection. A direct-path signal from the object (D) and a reflection path of the transmitted signal may be detected by the electronic device 101, and when the strength of the reflection path is greater, the electronic device 101 may determine the reflection path as the direct-path signal from the object (D). When this false positive occurs, it may be difficult to detect information about an object by identifying the distance and/or position of the object only through the UWB ranging function.

Radar is an abbreviation of radio detection and ranging, and may refer, for example, to a technology for detecting a nearby object using radio waves and measuring a position and/or a distance.

According to various embodiments, since a UWB signal may be configured in a pulse form, the electronic device 101 may detect a target object using a UWB signal as a radar signal, and may measure the position and/or distance thereof.

The electronic device 101 may reduce false positives using a UWB radar function in addition to the UWB ranging function.

Figure 4:
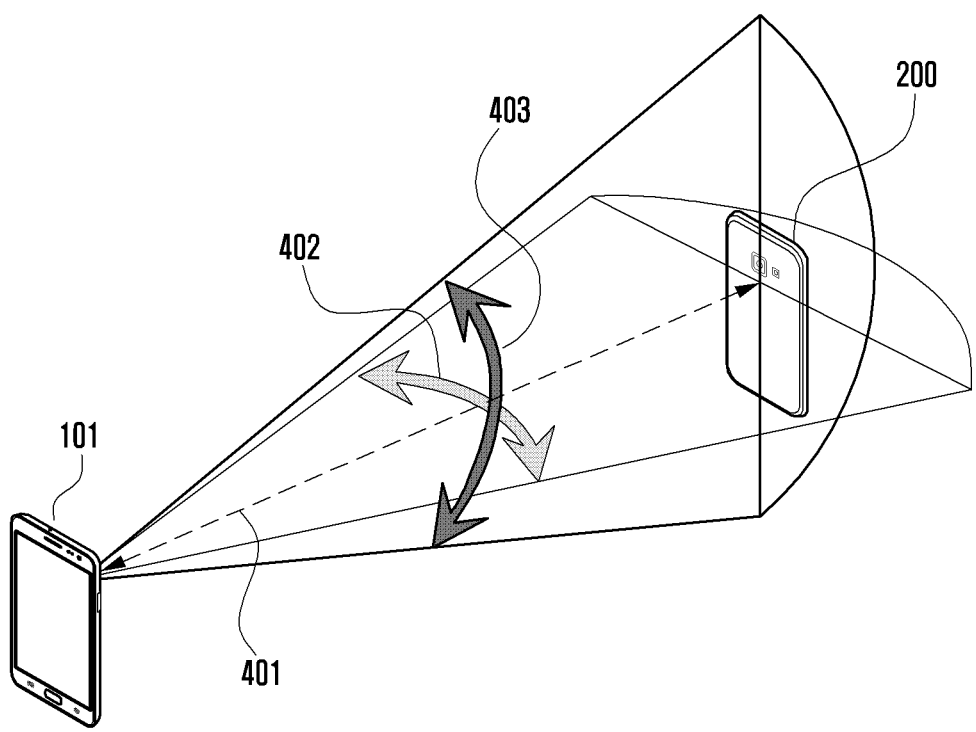
FIG. 4 illustrates an example detectable area using UWB communication of an electronic device according to various embodiments.

FIG. 4 illustrates an example detectable area using UWB communication of an electronic device (e.g., the electronic device 101 of FIG. 1) according to various embodiments.

Referring to FIG. 4, the electronic device 101 may transmit a UWB ranging signal and/or a UWB radar signal, and the transmitted signal may be received by an object 200 or may be reflected by the object 200.

According to an embodiment, the electronic device 101 may transmit a UWB ranging signal according to a UWB ranging function and may receive a UWB signal transmitted from the object 200 having received the UWB ranging signal, thereby obtaining the distance to the object 200 and an AOA value.

To obtain the distance to the object 200 and the AOA value using the UWB ranging function, the electronic device 101 may adopt two methods. A first method is one-way ranging, in which the electronic device 101 may measure the distance to the object 200 and/or an AOA value, based on time information included in a signal received from the object 200. A second method is two-way ranging, in which the electronic device 101 may transmit and receive a signal to and from the object 200 to synchronize time information to thereby measure the distance and/or an AOA value.

The electronic device 101 may measure the distance to the object 200 and/or a direction, based on the position thereof. To this end, the electronic device 200 may measure an AOA. For example, the electronic device 101 may measure the AOA of a signal received from the object 200 to discover the direction of the signal received by the electronic device 101 with respect to the object 200, thereby determining a relative direction of the object 200 and the electronic device 101.

According to an embodiment, the electronic device 101 may transmit a UWB radar signal according to a UWB radar function, and may obtain a UWB radar measurement value reflected by the object 200. When the UWB radar signal is reflected by the object 200, the electronic device 101 may receive the reflected UWB signal. As the UWB signal configured in the form of a pulse collides with the object 200 and is reflected, the configuration of the pulse may change. According to an embodiment, the electronic device 101 may receive the UWB signal reflected by the object 200 to discover information, such as the distance to the object 200, a direction, and/or an altitude. Here, the object 200 may include a different electronic device as described above, and may include various objects including an object, a human being, or an animal located around the electronic device 101.

The electronic device 101 may obtain various types of information from the UWB signal reflected by the object 200 and received. For example, the electronic device 101 may obtain, from the UWB signal reflected by the object 200 and received, information about whether the object 200 is a living thing, and information related to a biometric signal or information about a movement or gesture when the object 200 is a human being.

Referring to FIG. 4, the electronic device 101 may transmit a UWB signal for detecting an object (e.g., the object 200 of FIG. 2) through at least two, for example, three, antennas (e.g., the antennas ANT1, ANT2, and ANT3 of FIG. 2) according to the UWB radar function, and a detectable area in which the object 200 is detectable by the transmitted signal may include a three-dimensional field of view determined by a first value, a second value, and a third value. For example, the first value may include the length or range 401 of the detectable area, the second value may include the horizontal angle (AOA_azimuth) 402 of the detectable area, and the third value may include the vertical angle (AOA_elevation) 403 of the detectable area.

The electronic device 101 may transmit a UWB ranging signal and/or a UWB radar signal, and the transmitted signal may be received by the object 200 or may be reflected by the object 200. A measured value (e.g., measurement value 502 in FIG. 5) using the UWB ranging function may be calculated, for example, based on the phase difference between the waveforms (e.g., channel impulse response: CIR) of UWB signals respectively received by two antennas. For example, the indexes of timestamps and the peak values of phases measured at regular time intervals with respect to a first channel impulse response (CIR1) and a second channel impulse response (CIR2) respectively received by different antennas may be compared, thereby obtaining the distance to the object 200 and/or an AOA value.

According to an embodiment, the electronic device 101 may identify the confidence level of the detectable area based on the first value, the second value, and the third value, and may correct the result of whether the object 200 is in the detectable area. Accordingly, it is possible to reduce false positives.

According to an embodiment, to identify the confidence level of the detectable area, the electronic device 101 may transmit the UWB radar signal, and may determine a propagation environment, based on a signal received by the transmitted UWB radar signal being reflected by a surrounding environment including various surrounding objects. For example, in a relatively highly reflective propagation environment, the confidence level of the detectable area may be relatively increased, thereby reducing error occurrence. For example, in a relatively low reflective propagation environment, the confidence level may be relatively reduced, thereby enabling accurate detection.

According to an embodiment, the electronic device 101 may output a UWB radar signal having a specified signal waveform, and may identify a surrounding propagation environment, based on a characteristic of a peak value of a waveform (CIR) of a signal received by reflection by the surrounding environment. For example, the peak value uniformly occurring in the measured CIR may be determined as a highly reflective propagation environment, and the CIR peak value nonuniformly occurring may be determined as a low reflective propagation environment.

According to an embodiment, an electronic device (e.g., the electronic device 101 of FIG. 1 or FIG. 2) may include a wireless communication circuit (e.g., the communication module 190 of FIG. 1 or FIG. 2) and at least one processor (e.g., the processor 120 of FIG. 1 or FIG. 2) configured to be adaptively connected to the wireless communication circuit, wherein the processor may be configured to obtain data about a detectable area for an object, based on a UWB measurement signal transmitted using the wireless communication circuit, obtain (e.g., calculate) a confidence level for the data about the detectable area, adjust a threshold value of the confidence level according to a propagation environment measured using the wireless communication circuit, and filter and output the data about the detectable area, based on the adjusted threshold value of the confidence level.

According to an embodiment, the data about the detectable area may include a first value for a range, a second value for an azimuth, and a third value for an elevation.

According to an embodiment, the processor may measure the propagation environment according to a variation in an index of a peak value of a channel impulse response (CIR) measured through the wireless communication circuit.

According to an embodiment, the processor may be configured to identify the propagation environment as a relatively low reflective propagation environment when there are a large number of variations in the index of the peak value, and to identify the propagation environment as a relatively highly reflective propagation environment when there are a small number of variations in the index of the peak value.

According to an embodiment, the processor may be configured to adjust the threshold value to a relatively low value in the low reflective propagation environment, and to adjust the threshold value to a relatively high value in the highly reflective propagation environment.

According to an embodiment, the processor may be configured to filter the data about the detectable area and output the filtered data.

According to an embodiment, the processor may be configured to obtain (e.g., calculate) the confidence level, based on the data about the detectable area or the filtered data about the detectable area.

According to an embodiment, the processor may be configured to obtain (e.g., calculate) the confidence level, based on a difference value between the data about the detectable area or the filtered data about the detectable area.

According to an embodiment, the processor may be configured to obtain (e.g., calculate) the confidence level, based on an error covariance matrix for the filtered data about the detectable area.

According to an embodiment, the processor may control a UWB radar signal and a UWB ranging signal to be transmitted using the wireless communication circuit in the same communication session or in different sessions in transmitting the UWB measurement signal.

Figure 5:
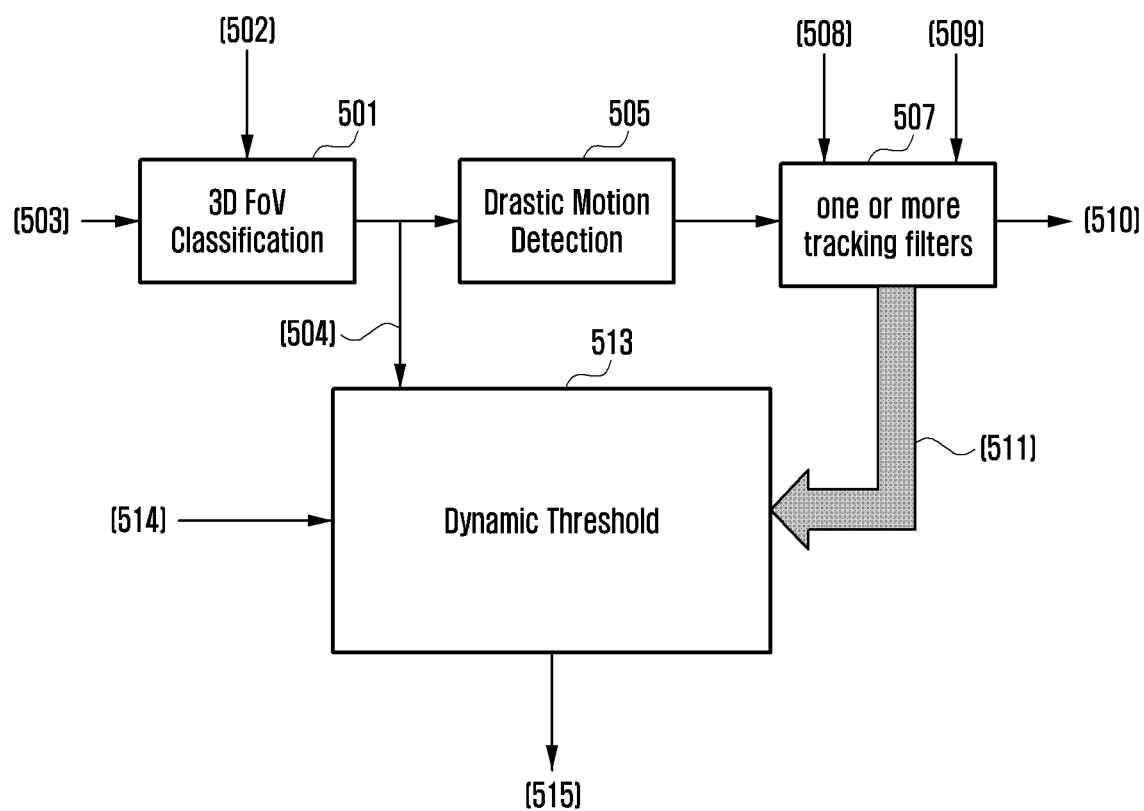
FIG. 5 is a conceptual diagram illustrating an example operation of an electronic device detecting an object according to various embodiments.

FIG. 5 is a flowchart illustrating an example operation of an electronic device (e.g., the electronic device 101 of FIG. 1) for detecting an object (e.g., the object 200 of FIG. 2) according to various embodiments.

According to an embodiment, to detect an object, the electronic device 101 may obtain, in operation 501, information 504 about a detectable area for detecting a target object, based on a measurement value 502, using a UWB signal and/or a UWB feature obtained based on the UWB measurement value.

The information 504 about the detectable area may include, for example, at least one of a first value (e.g., range), a second value (e.g., horizontal angle AOA_azimuth), or a third value (e.g., vertical angle AOA_elevation). Information about a 3D detectable area may include all of the first value, the second value, and the second value.

The electronic device 101 may obtain the information 504 about the detectable area using the measurement value 502 using a UWB ranging function. The electronic device 101 may obtain the detectable area for detecting the target object using the UWB ranging measurement value 502 and additionally the UWB feature 503 obtained based on at least part of the UWB ranging measurement value 502. The electronic device 101 may calculate a feature vector, based on the measurement value 502 and/or the feature 503 and may determine whether the target object is positioned inside or outside the detectable area.

The electronic device 101 may output at least one of the first value, the second value, and/or the third value, for example, using a machine learning technique, such as a support vector machine (SVM) and/or a long short-term memory (LSTM), based on the UWB measurement value 502 and/or the feature 503.

The measurement value 502 based on the UWB ranging function may be obtained, for example, based on single-sided two-way-ranging (SS-TWR) or double-sided two-way ranging (DS-TWR) between the electronic device 101 and the object 200. SS-TWR is a method of performing ranging by measuring a round-trip delay of one message and a response transmitted between the electronic device 101 and the object 200. DS-TWR as an extension of SS-TWR is a method of deriving a time-of-flight (TOF) result by performing two round-trip time measurements and combining two round-trip time measurements.

UWB radar and UWB ranging may be performed in the same session or in different sessions within one communication period.

Figure 6A:
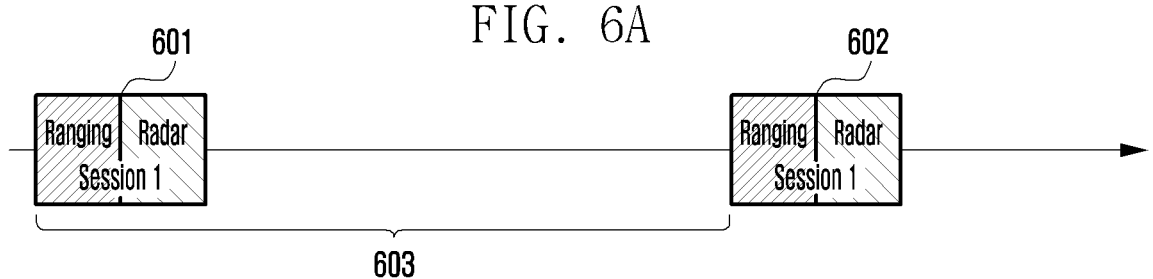
FIGS. 6A and 6B illustrate example UWB measurement operations of an electronic device according to various embodiments.
Figure 6B:
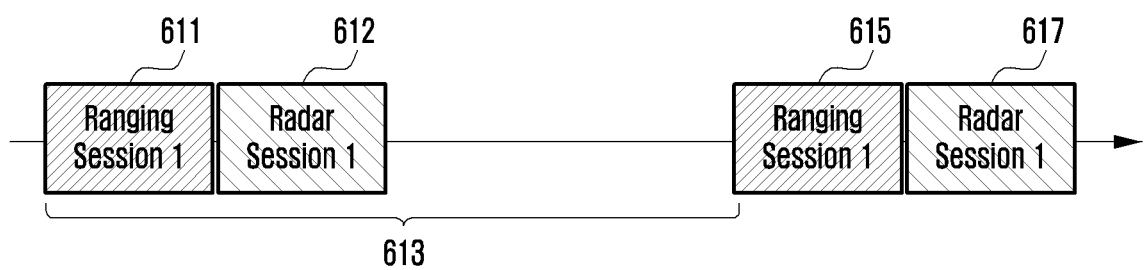

FIGS. 6A and 6B illustrate an example UWB measurement operation of an electronic device according to various embodiments. An interval 603 or 613 between one communication period and a next communication period may be, for example, 100 milliseconds (ms).

Referring to FIG. 6A, UWB radar may be performed in a UWB ranging session 601 or 602 within one period. After a UWB ranging session 601 is performed, a UWB ranging session 602 may be performed after an interval 603.

FIG. 6B shows an example in which, within one communication period, UWB ranging is performed in a ranging session 611 and UWB radar is performed in a separate radar session 612 after the ranging session 611 is terminated. After the UWB ranging session 611 is performed, a UWB ranging session 615 and UWB radar session 617 may be performed after an interval 613. The separate radar session 612 may be performed between the UWB ranging session 611 and the UWB ranging session 615.

Referring back to FIG. 5, in operation 505 for drastic motion detection, the electronic device 101 may identify whether a sudden (drastic) movement of the electronic device 101 occurs. For example, when a sensor value exceeding a specified threshold value is measured based on a sensor value of a motion sensor of a sensor module (e.g., the sensor module 176 of FIG. 2), the electronic device 101 may determine that a sudden movement has occurred. When a sudden movement of the electronic device 101 occurs, UWB measurement may be performed again, for example, due to a calculating load for a UWB value measured before the sudden movement. Operation 505 may be omitted in some embodiments.

According to an embodiment, in operation 507, the electronic device 101 may filter the information about the detectable area for the target object, based on a UWB measurement value 508, and may update the range of the detectable area for the object 200 including at least one of the filtered first value (e.g., range), second value (e.g., horizontal angle AOA_azimuth), or third value (e.g., vertical angle AOA_elevation).

According to an embodiment, the electronic device 101 may additionally filter the first value, the second value, and the third value further considering a sensor value 509 received through various sensors (e.g., the sensor module 176 of FIG. 1), such as a gyro sensor, an acceleration sensor, and a motion sensor of the electronic device 101, in addition to the UWB measurement value 508.

According to an embodiment, the electronic device 101 may use various filters, for example, including an extended Kalman filter (EKF), a Kalman filter, or a particle filter, as a tracking filter in operation 507.

According to an embodiment, a state vector denoting the detectable area for the target object 200 calculated based on the UWB measurement value may be defined as $X_t=[x_t, y_t, z_t]^T$. Here, $x_t$, $y_t$, and $z_t$ may denote coordinates of the 3D detectable area, for example, the first value, the second value, and the third value, for the target object 200 calculated based on the UWB measurement value 508 according to time t.

According to an embodiment, the first value as range (r), the second value as AOA_az, and the third value as AOA_el calculated from the UWB measurement value 508 may be expressed as $[r_t, AoA\_az_t, AOA\_el_t]^T$. These values may include various noise components, such as noise due to an obstacle.

According to an embodiment, a state transition equation may be expressed as Equation 1.

$$x_t = A_t x_{t-1} + w_t \quad \text{[Equation 1]}$$

Here, $w_t$ denotes noise, and $A_t$ denotes a state transition matrix, which may denote a rotation matrix between two UWB measurement values. For example, $A_t$ may be obtained from a sensor value 509 received through the sensor module 176, for example, an orientation measurement value.

According to an embodiment, the state vector $X_t=[x_t, y_t, z_t]^T$ may be updated through Equation 2 to Equation 6.

$$\text{innovation} = \begin{bmatrix} r_{measured} \\ \theta_{measured} \\ \phi_{measured} \end{bmatrix} - \begin{bmatrix} r_{predict} \\ \theta_{predict} \\ \phi_{predict} \end{bmatrix} \quad \text{[Equation 2]}$$

$$K_t = \hat{P}_t * H' * (H * \hat{P}_t * H' + R)^{-1} \quad \text{[Equation 3]}$$

$$x_t = \hat{x}_t + K_t * \text{innovation} \quad \text{[Equation 4]}$$

$$H = \begin{bmatrix} \frac{x}{\sqrt{x^2+y^2+z^2}} & \frac{y}{\sqrt{x^2+y^2+z^2}} & \frac{x}{\sqrt{x^2+y^2+z^2}} \\ \frac{-z}{x^2+y^2} & 0 & \frac{x}{x^2+z^2} \\ \frac{(-xy)}{(x^2+y^2+z^2)\sqrt{x^2+z^2}} & \frac{\sqrt{x^2+z^2}}{(x^2+y^2+z^2)} & \frac{(-zy)}{((x^2+y^2+z^2)\sqrt{x^2+z^2})} \end{bmatrix} \quad \text{[Equation 5]}$$

$$P_t = (I_3 - K_t * H) * \hat{P}_t \quad \text{[Equation 6]}$$

Here, $K_t$ is a Kalman gain vector, $P_t$ is an error covariance matrix, and R is a measurement noise covariance matrix used to obtain the Kalman gain vector, which may be a value obtained by experimentation.

According to an embodiment, in operation 511, the electronic device 101 may determine (e.g., calculate) a confidence level for the filtered detectable area range, for example, the first value, the second value, and/or the third value.

According to an embodiment, the electronic device 101 may calculate the confidence level, based on the difference between the filter output in operation 507, that is, the filtered first value, second value, and third value, and the UWB measurement value.

The electronic device 101 may buffer the absolute value $\text{abs}(r_t - r_t^o)$ of the difference between the filtered first value (e.g., a filter output range value) and a measured range value (unit: meter) as a recentRangeDiffs value, the absolute value $\text{abs}(az_t - az_t^o)$ of the difference between the filtered second value (e.g., a filter output azimuth) and a measured azimuth (unit: degree) as a recentAzDiffs value, and the absolute value $\text{abs}(el_t - el_t^o)$ of the difference between the filtered third value (e.g., a filter output elevation) and a measured elevation as a recentElDiffs value. The size of a buffer may be maintained, for example, at 10 in each example, although the disclosed embodiments are not limited in this respect.

The electronic device 101 may calculate the respective confidence levels, based on the buffered difference values as shown in Equation 7.

$$\text{Rangeconfidence} = \max(0.1 - \text{mean}(recentRangeDiffs)) \quad \text{[Equation 7]}$$
$$\text{Azimuthconfidence} = \max\left(0.1 - \frac{\text{mean}(recentAzDiffs)}{90}\right)$$
$$\text{Elevationconfidence} = \max\left(0.1 - \frac{\text{mean}(recentElDiffs)}{90}\right)$$

According to various embodiments, the electronic device 101 may calculate the confidence level, based on an EKF error covariance matrix T calculated based on the filter output of operation 507, that is, the filtered first value, second value, and third value.

According to an embodiment, the error covariance matrix T may be calculated by Equation 8.

$$T = H * P * H' \quad \text{[Equation 8]}$$

Here, P may be the error covariance matrix of Equation 6, and H may be a Jacobian matrix of Equation 5.

According to an embodiment, the Jacobian matrix H may be used as a state transition matrix by Equation 9.

$$\begin{bmatrix} r \\ \theta \\ \phi \end{bmatrix} = \begin{bmatrix} H_{11} & H_{12} & H_{13} \\ H_{21} & H_{22} & H_{23} \\ H_{31} & H_{32} & H_{33} \end{bmatrix} * \begin{bmatrix} x \\ y \\ z \end{bmatrix} \quad \text{[Equation 9]}$$

According to an embodiment, an error level may be calculated based on the error covariance matrix T of Equation 6 by Equation 10.

$$\text{errorRange} = \sqrt{T(1,1)}$$
$$\text{errorAzimuth} = \sqrt{T(2,2)}$$
$$\text{errorElevation} = \sqrt{T(3,3)} \quad \text{[Equation 10]}$$

Here, T(1,1), T(2,2), and T(3,3) are diagonal elements of the error covariance matrix T, and confidence values may be calculated by Equation 11. errorRange may be a meter value, and errorAzimuth and errorElevation may be radian values.

$$\text{confidence of range} = \quad \text{[Equation 11]}$$
$$\min\left(1, \max\left(0, \frac{\text{max}ErrorRange - errorRange}{\text{max}ErrorRange - \text{min}ErrorRange}\right)\right)$$

confidence of azimuth =
$$\min\left(1, \max\left(0, \frac{\text{max}ErrorAzimuth - errorAzimuth}{\text{max}ErrorAzimuth - \text{min}ErrorAzimuth}\right)\right)$$

confidence of elevation =
$$\min\left(1, \max\left(0, \frac{\text{max}ErrorEelevation - errorEelevation}{\text{max}ErrorEelevation - \text{min}ErrorEelevation}\right)\right)$$

Here, maxErrorRange, minErrorRange, maxErrorAzimuth, minErrorAzimuth, maxErrorElevation, and minErrorElevation may be obtained from the maximum value and the minimum value of respective error values, and confidence levels for the output error values may be mapped to a value ranging from 0 to 1. For example, when minErrorRange=0.05 m and maxErrorRange=0.3 m, minErrorAzimuth=3 deg., maxErrorAzimuth=30 deg, minErrorElevation=3 deg., and maxErrorElevation=30 deg.

According to an embodiment, the electronic device 101 may obtain information about a propagation environment in dynamic threshold operation 513, and may change a threshold value for the confidence level according to the determined propagation environment. The electronic device 101 may transmit a UWB radar signal, may receive a signal 514 resulting from reflection of the transmitted UWB radar signal by a surrounding environment including various surrounding objects, and may obtain information 514 about the propagation environment, based on the reflected signal.

According to an embodiment, the electronic device 101 may output a UWB radar signal having a specified signal waveform and may identify a surrounding propagation environment, based on a characteristic of a peak value of a waveform (CIR) of a signal reflected by a surrounding environment and received. For example, a peak value uniformly occurring in the measured CIR may be determined as indicative being of a highly reflective propagation environment, and the CIR peak value nonuniformly occurring may be determined as being indicative of a low reflective propagation environment.

According to an embodiment, the electronic device 101 may adjust the threshold value for the confidence level, based on the information about the propagation environment. For example, in a highly reflective propagation environment, error occurrence may be reduced by relatively increasing the confidence level, thereby increasing detection accuracy. For example, in a low reflective propagation environment, the confidence level may be relatively reduced, thereby extending a detection range and increasing accuracy.

Figure 7:
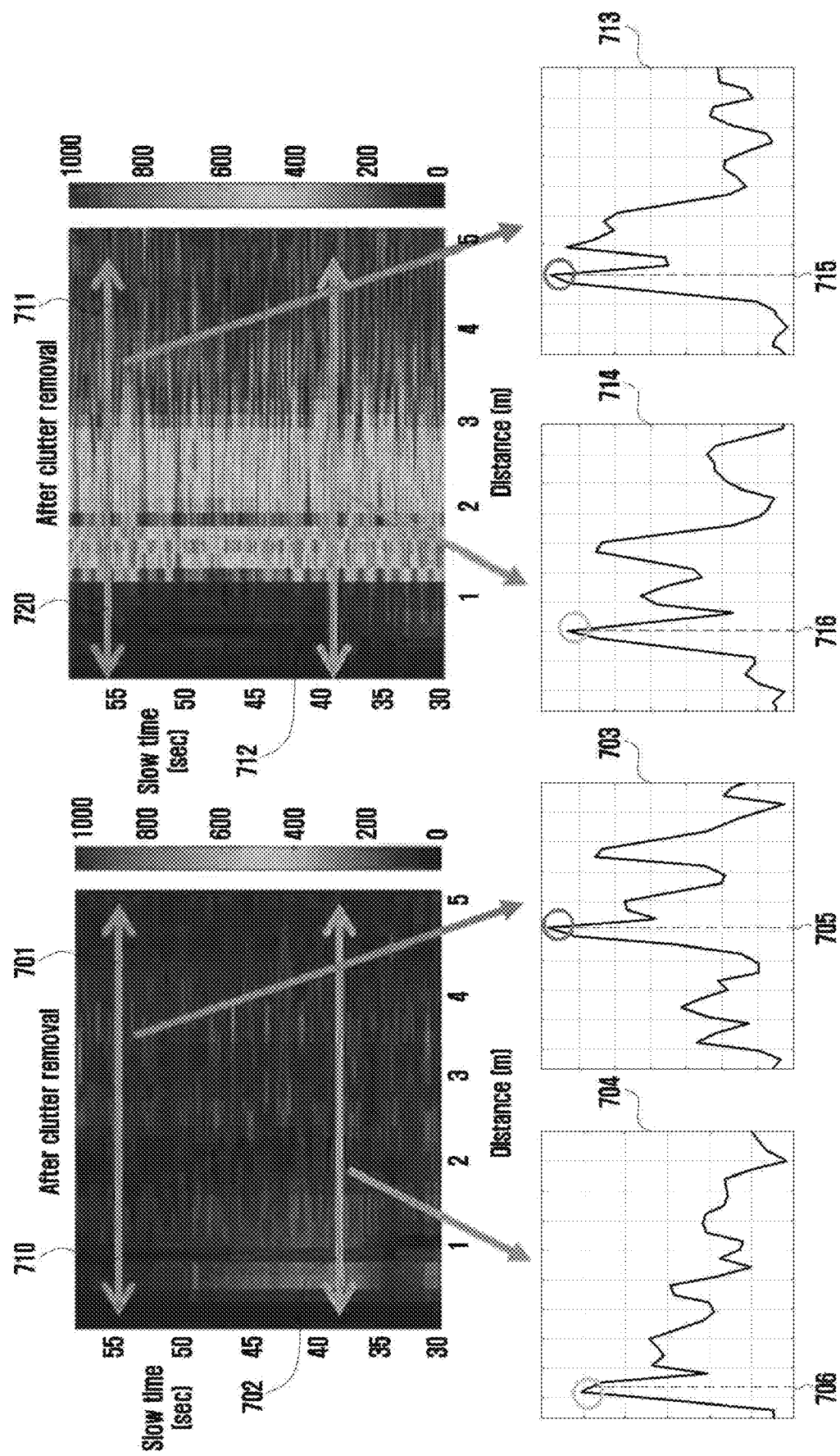
FIG. 7 illustrates a characteristic of an example measurement signal according to a propagation environment of an electronic device according to various embodiments.

FIG. 7 illustrates a characteristic of an example measurement signal according to a propagation environment of an electronic device according to various embodiments.

A slide 710 and a slide 720 of FIG. 7 are slides showing a channel impulse response (CIR) received through each UWB antenna according to a slow time, measured according to a distance. In a graph 703 and a graph 704 of the slide 710 and a graph 713 and a graph 714 of the slide 720, an x-axis may denote the index of a timestamp measured at regular intervals, and a y-axis may denote a CIR value, which is a range calculated using a measured signal.

For example, the left slide 710 may show an example of an environment in which a target object (e.g., a smartphone) is positioned directly in front of the electronic device 101, and there is no propagation obstacle in front of the electronic device 101 and thus reflection of radio waves does not occur. In this case, a true FoV rate may be 100. Referring to the graph 703 and the graph 704 of the left slide 710, the peak value of the CIR measured according to a slow time 701 appears in an index 705, the peak value of the CIR measured according to a slow time 702 appears in an index 706, and the two indices are different from each other, and thus the uniform peak values do not appear. Therefore, uniform CIR peak values are not seen to appear in a low reflective propagation environment.

For example, the right slide 720 may show an example of an environment in which a target object (e.g., a smartphone) is positioned directly behind the electronic device 101, and there is a propagation obstacle, such as a metallic wall, behind the electronic device 101 and thus reflection of radio waves occurs. In this case, a true FoV rate may be 0. Referring to the graph 713 and the graph 714 of the right slide 720, the peak value of the CIR measured according to a slow time 711 appears in an index 715 in the graph 713, the peak value of the CIR measured according to a slow time 712 appears in an index 716 in the graph 714, and the two indices are the same, and thus the uniform peak values appear. Therefore, uniform CIR peak values are seen to appear in a highly reflective propagation environment.

Referring back to FIG. 5, the electronic device 101 may determine and output the filtered information (FOV) 515 about the detectable area for detecting the object 200 obtained in operation 501, based on the confidence level adjusted according to the threshold value determined based on the information 514 about the propagation environment.

Figure 8A:
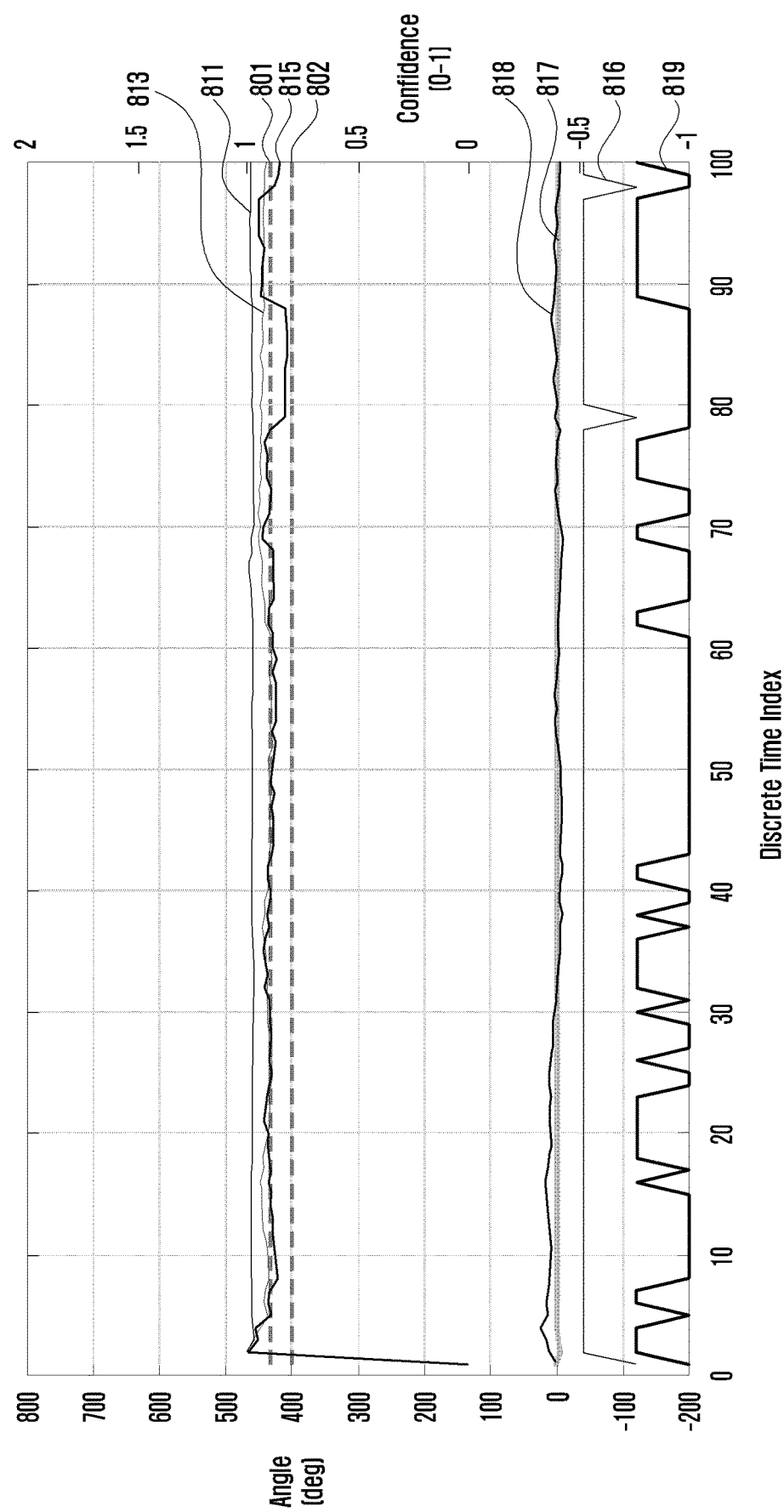
FIG. 8A and FIG. 8B are graphs illustrating an example in which the probability of occurrence of an error in detectable area information is changed according to an operation of an electronic device adjusting a confidence level according to various embodiments.
Figure 8B:
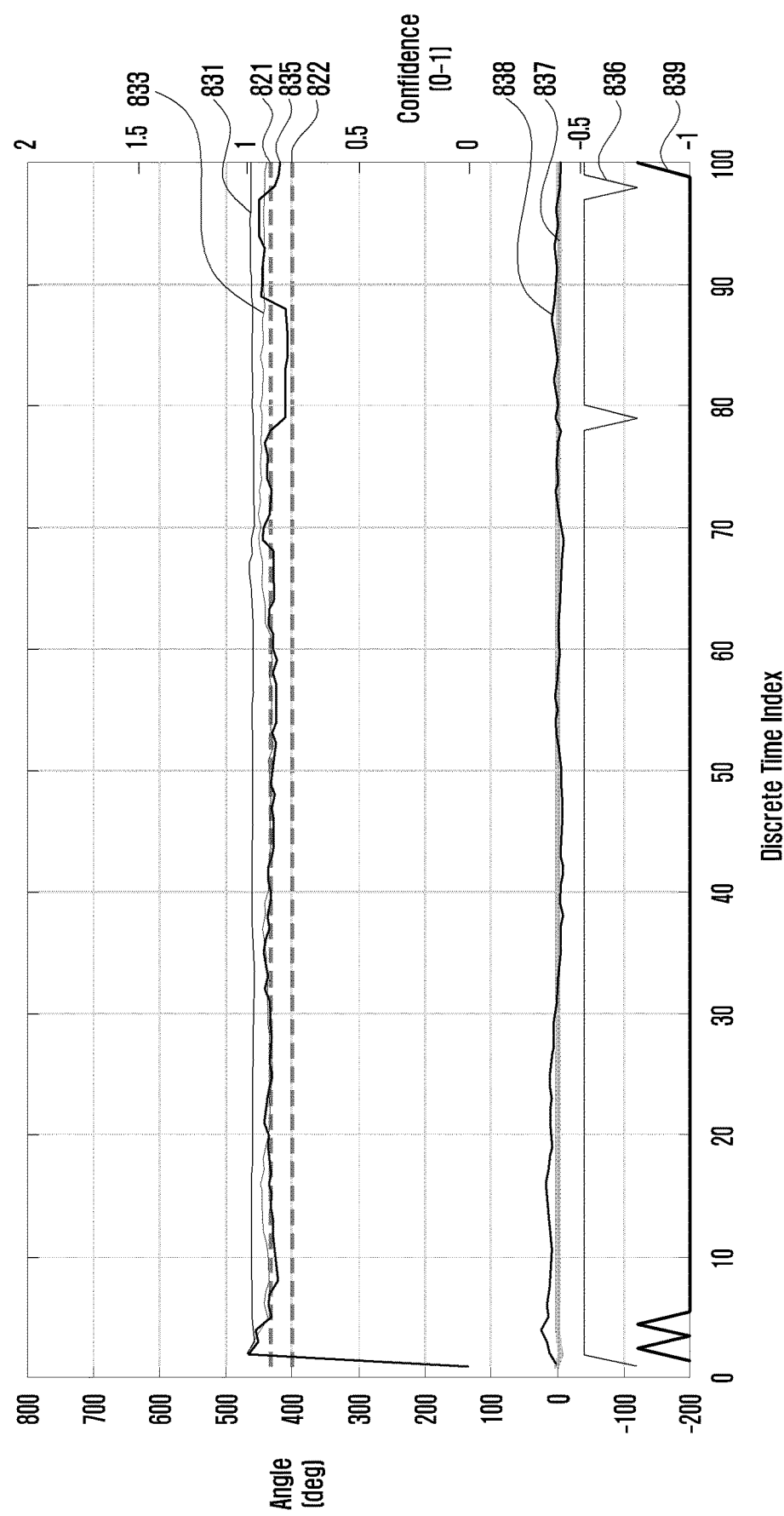

FIG. 8A and FIG. 8B are graphs illustrating an example in which the probability of occurrence of an error in detectable area information is changed according to an operation of an electronic device adjusting a confidence level according to various embodiments.

FIG. 8A and FIG. 8B show an example of an environment in which a target object (e.g., a smartphone) is positioned directly behind an electronic device 101, and there is a propagation obstacle, such as a metallic wall, behind the electronic device 101 and thus reflection of radio waves occurs as shown in the right slide 720 of FIG. 7. In this case, a true FoV rate may be 0.

In FIG. 8A, an azimuth confidence 811, a range confidence 813, and an elevation confidence 815 may be calculated for an output FOV 816, an output azimuth 817, and an output elevation 818 based on UWB measurement values, and various threshold values including a 90% threshold value 801 or an 80% threshold value 802 may be applied to a confidence level. In the drawing, when the 90% threshold value is applied, the true FOV rate of the filtered FOV 819 may be 40%, which is significantly different from the true FoV rate of 0.

In FIG. 8B, the same azimuth confidence 831, range confidence 833, and elevation confidence 835 may be calculated for the output FOV 836, the output azimuth 837, and the output elevation 838 based on the same UWB measurement values as in FIG. 8A, and when a 95% threshold value rather than the 90% threshold value 821 or the 80% threshold value 822 is applied to a confidence level, the true FOV rate of the filtered FOV 839 may be sharply reduced to 3%, which is close to the true FoV rate. Therefore, in a propagation environment having a high reflectance, a relatively high threshold value is applied to a confidence level, thereby solving a problem of a false positive (FB).

Figure 9A:
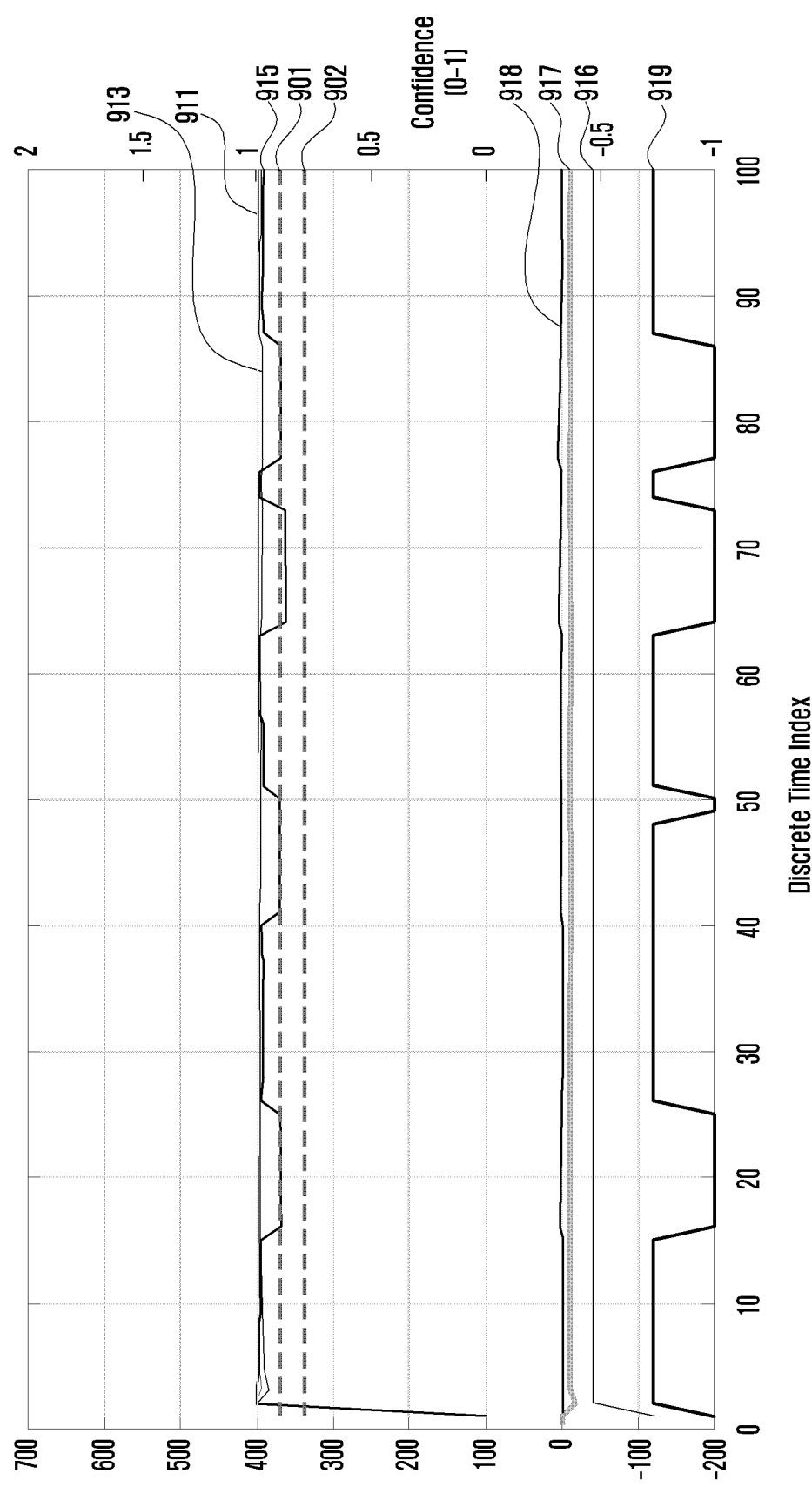
FIG. 9A and FIG. 9B are graphs illustrating another example in which the probability of occurrence of an error in detectable area information is changed according to an operation of an electronic device adjusting a confidence level according to various embodiments.
Figure 9B:
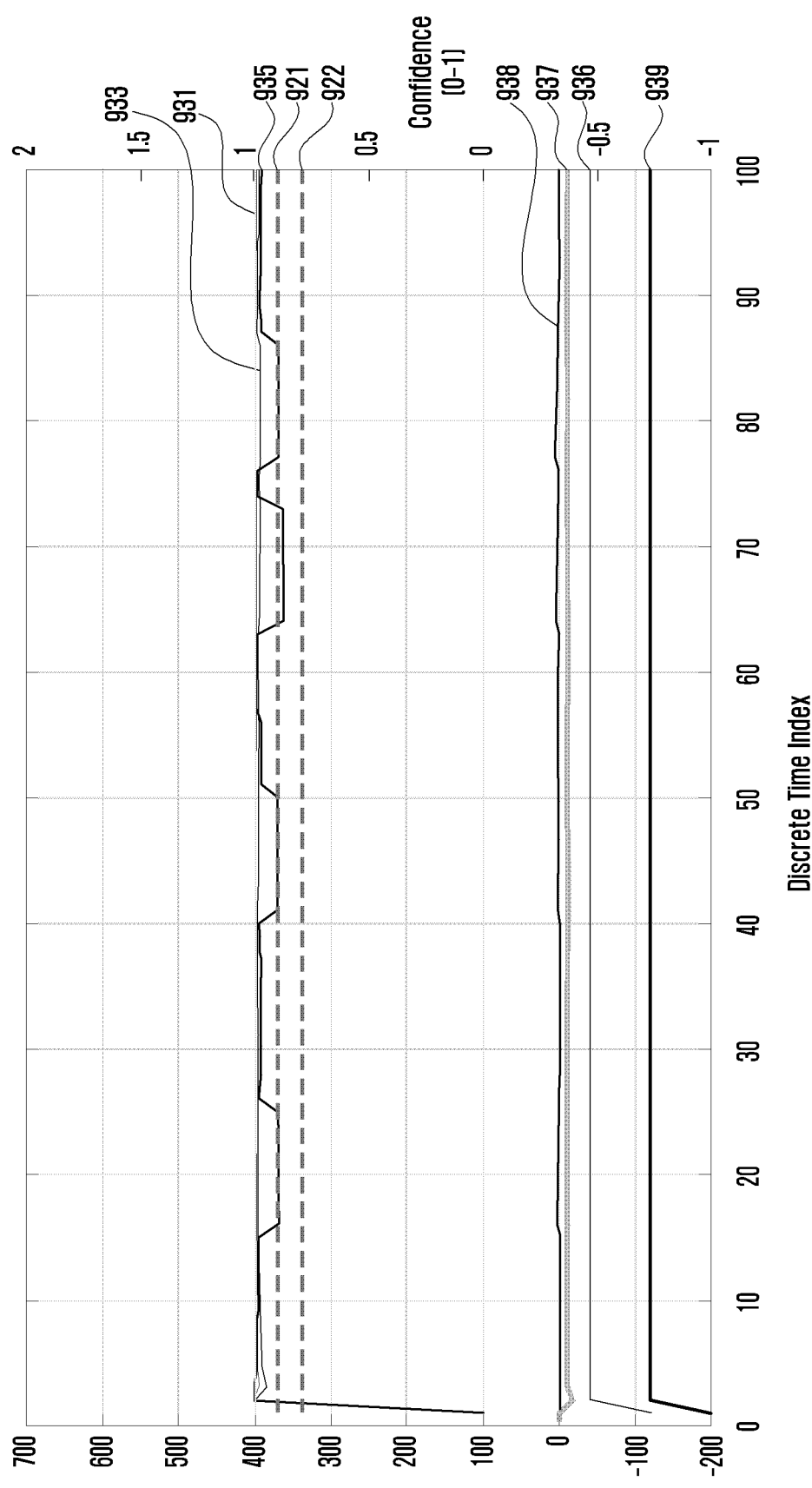

FIG. 9A and FIG. 9B are graphs illustrating another example in which the probability of occurrence of an error in detectable area information is changed according to an operation of an electronic device adjusting a confidence level according to various embodiments.

FIG. 9A and FIG. 9B show an example of an environment in which a target object (e.g., a smartphone) is positioned directly in front of an electronic device 101, and there is no propagation obstacle in front of the electronic device 101 and thus reflection of radio waves does not occur as shown in the left slide 710 of FIG. 7. In this case, a true FoV rate may be 100.

In FIG. 9A, an azimuth confidence 911, a range confidence 913, and an elevation confidence 915 may be calculated for an output FOV 916, an output azimuth 917, and an output elevation 918 based on UWB measurement values, and various threshold values including a 95% threshold value 901 or an 90% threshold value 902 may be applied to a confidence level. In the drawing, when the 90% threshold value is applied, the true FOV rate of the filtered FOV 919 may be 67%, which is significantly different from the true FoV rate of 100.

In FIG. 9B, the same azimuth confidence 931, range confidence 933, and elevation confidence 935 may be calculated for the output FOV 936, the output azimuth 937, and the output elevation 938 based on the same UWB measurement values as in FIG. 9A, and when a 85% threshold value rather than the 95% threshold value 921 or the 90% threshold value 922 is applied to a confidence level, the true FOV rate of the filtered FOV 939 may be 99%, which is close to the true FoV rate of 100. Therefore, in a propagation environment having a low reflectance, a relatively low threshold value is applied to a confidence level, thereby solving a problem of a false positive (FB).

Figure 10:
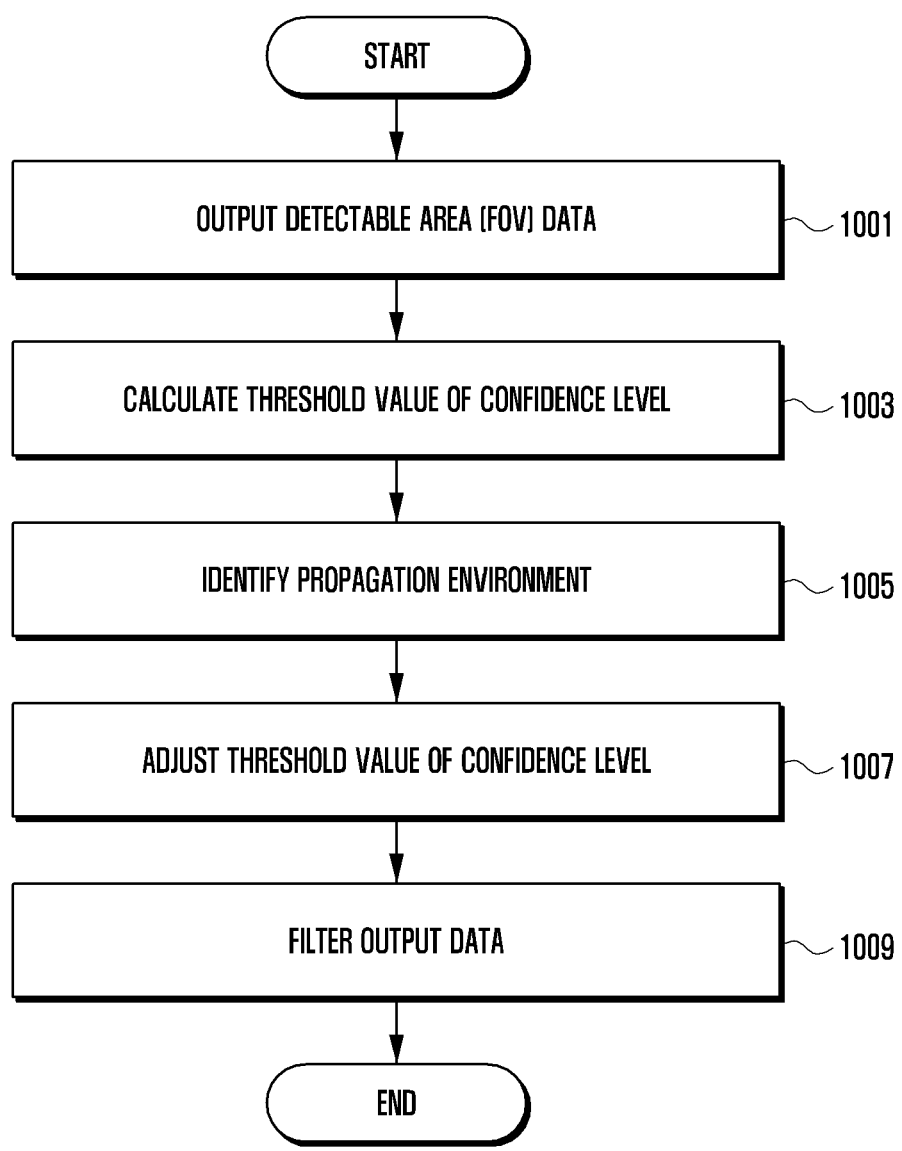
FIG. 10 is a flowchart illustrating an example method for determining an object detectable area according to confidence level adjustment of an electronic device according to various embodiments.

FIG. 10 is a flowchart illustrating an example method for determining an object (e.g., the object 200 of FIG. 2) detectable area according to confidence level adjustment of an electronic device (e.g., the electronic device 101 of FIG. 1 or FIG. 2) according to various embodiments.

According to an embodiment, to detect an object, the electronic device 101 may obtain data about a detectable area (FOV) for detecting a target object, based on a measurement value using a UWB ranging signal in operation 1001.

The data about the detectable area may include, for example, at least one of a first value (e.g., range), a second value (e.g., horizontal angle AOA_azimuth), or a third value (e.g., vertical angle AOA_elevation). Information about a 3D detectable area may include all of the first value, the second value, and the second value.

According to an embodiment, in operation 1003, the electronic device 101 may calculate a confidence level for the output data about the detectable area for the object 200.

According to an embodiment, the electronic device 101 may calculate the confidence level, based on the difference between the output data about the detectable area and data on the detectable area corrected through filtering of the output data about the detectable area, for example, with reference to Equation 5.

According to an embodiment, the electronic device 101 may calculate the confidence level, based on an error covariance matrix T of data about the detectable area corrected through filtering based on the output data about the detectable area, for example, with reference to Equation 9.

The electronic device 101 may use various filters, for example, including an extended Kalman filter (EKF), a Kalman filter, or a particle filter to correct the data about the detectable area.

According to an embodiment, the electronic device 101 may identify a propagation environment in operation 1005. According to an embodiment, the electronic device 101 may adjust a threshold value for the confidence level according to the identified propagation environment in operation 1007.

According to an embodiment, the electronic device 101 may transmit a UWB radar signal, may receive a signal 514 resulting from reflection of the transmitted UWB signal by a surrounding environment including various surrounding objects, and may determine the propagation environment, based on the reflected signal. For example, in a relatively highly reflective propagation environment, the confidence level may be relatively increased, thereby reducing error occurrence. For example, in a relatively low reflective propagation environment, the confidence level may be relatively reduced, thereby enabling accurate detection.

According to an embodiment, the electronic device 101 may identify the propagation environment, based on a characteristic of a peak value of a waveform (CIR) of a signal reflected and received according to output of the UWB radar signal. For example, the peak value uniformly occurring in the measured CIR may be determined as a highly reflective propagation environment, and the CIR peak value nonuniformly occurring may be determined as a low reflective propagation environment. For example, the threshold value for the confidence level may be configured to be relatively high in a highly reflective propagation environment, and may be configured to be relatively low in a low reflective propagation environment.

According to an embodiment, the electronic device 101 may filter the detectable area (FOV), based on the confidence level adjusted according to the adjusted threshold value in operation 1009, and may determine and output whether the object 200 is detectable in the filtered detectable area (FOV).

According to an embodiment, a method for an electronic device (e.g., the electronic device 101 of FIG. 1 to FIG. 4) may be configured to perform obtaining data about a detectable area for an object, based on a UWB measurement signal transmitted through a wireless communication circuit, calculating a confidence level for the data about the detectable area, adjusting a threshold value of the confidence level according to a propagation environment measured through the wireless communication circuit, and filtering and outputting the data about the detectable area, based on the adjusted threshold value of the confidence level.

According to an embodiment, the data about the detectable area may include a first value for a range, a second value for an azimuth, and a third value for an elevation.

The method may further include measuring the propagation environment according to a variation in an index of a peak value of a channel impulse response (CIR) measured through the wireless communication circuit.

According to an embodiment, the measuring of the propagation environment may be configured to determine the propagation environment as a relatively low reflective propagation environment when there are a great number of variations in the index of the peak value, and to determine the propagation environment as a relatively highly reflective propagation environment when there are a small number of variations in the index of the peak value.

According to an embodiment, the adjusting of the threshold value of the confidence level may be configured to adjust the threshold value to a relatively low value in the low reflective propagation environment, and to adjust the threshold value to a relatively high value in the highly reflective propagation environment.

According to an embodiment, the method may further include filtering the data about the detectable area to output the filtered data about the detectable area.

According to an embodiment, the calculating of the confidence level may be configured to calculate the confidence level, based on at least one of the data about the detectable area or the filtered data about the detectable area.

According to an embodiment, the calculating of the confidence level may be configured to calculate the confidence level, based on a difference value between the data about the detectable area or the filtered data about the detectable area.

According to an embodiment, wherein the calculating of the confidence level may be configured to calculate the confidence level, based on an error covariance matrix for the filtered data about the detectable area.

According to an embodiment, in the method, a UWB radar signal and a UWB ranging signal are transmitted through the wireless communication circuit in the same communication session or in different sessions in transmitting the UWB measurement signal.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a wireless communication circuit; and
at least one processor comprising processing circuitry configured to be adaptively connected to the wireless communication circuit, wherein the at least one processor is configured to:
obtain data about a detectable area for an object, based on an ultra-wideband (UWB) measurement signal transmitted using the wireless communication circuit,
obtain a confidence level for the data about the detectable area,
obtain propagation environment information based on a variation in a timestamp index of peak values of phases measured through the wireless communication circuit with respect to a channel impulse response (CIR);
identify a propagation environment as a low reflective propagation environment based on a large variation in the timestamp index of the peak values, and identify the propagation environment as a high reflective propagation environment based on a small variation in the timestamp index of the peak values,
adjust a threshold value of the confidence level according to the propagation environment information, and
filter and output the data about the detectable area, based on the adjusted threshold value of the confidence level.

2. The electronic device of claim 1, wherein the data about the detectable area comprises at least one of a first value for a range, a second value for an azimuth, or a third value for an elevation.

3. The electronic device of claim 1, wherein the at least one processor is configured to lower the threshold value in the low reflective propagation environment, and to increase the threshold value in the high reflective propagation environment.

4. The electronic device of claim 3, wherein the at least one processor is configured to control the wireless communication circuit to transmit a UWB radar signal and a UWB ranging signal in a same communication session or in different communication sessions for transmitting the UWB measurement signal.

5. The electronic device of claim 1, wherein the at least one processor is configured to filter the data about the detectable area and output the filtered data about the detectable area.

6. The electronic device of claim 5, wherein the at least one processor is configured to obtain the confidence level, based on the data about the detectable area or the filtered data about the detectable area.

7. The electronic device of claim 6, wherein the at least one processor is configured to obtain the confidence level, based on a difference value between the data about the detectable area and the filtered data about the detectable area.

8. The electronic device of claim 6, wherein the at least one processor is configured to obtain the confidence level, based on an error covariance matrix for the filtered data about the detectable area.

9. A method for an electronic device comprising:
obtaining data about a detectable area for an object, based on an ultra-wideband (UWB) measurement signal transmitted using a wireless communication circuit;
obtaining a confidence level for the data about the detectable area;
obtaining propagation environment information based on variation in a timestamp index of peak values of phases measured through the wireless communication circuit with respect to a channel impulse response (CIR);
identifying a propagation environment as a low reflective propagation environment based on a large variation in the timestamp index of the peak values, and identifying the propagation environment as a high reflective propagation environment based on a small variation in the timestamp index of the peak values;
adjusting a threshold value of the confidence level according to the propagation environment information; and
filtering and outputting the data about the detectable area, based on the adjusted threshold value of the confidence level.

10. The method of claim 9, wherein the data about the detectable area comprises at least one of a first value for a range, a second value for an azimuth, or a third value for an elevation.

11. The method of claim 9, further comprising lowering the threshold value in the low reflective propagation environment, and increasing the threshold value in the high reflective propagation environment.

12. The method of claim 11, further comprising transmitting, using the wireless communication circuit, a UWB radar signal and a UWB ranging signal in a same communication session or in different communication sessions for transmitting the UWB measurement signal.

13. The method of claim 9, further comprising:
filtering the data about the detectable area and outputting the filtered data about the detectable area.

14. The method of claim 13, further comprising obtaining the confidence level, based on at least one of the data about the detectable area or the filtered data about the detectable area.

15. The method of claim 14, further comprising obtaining the confidence level, based on a difference value between the data about the detectable area and the filtered data about the detectable area.

16. The method of claim 14, further comprising obtaining the confidence level, based on an error covariance matrix for the filtered data about the detectable area.

* * * * *